Patented Aug. 14, 1934

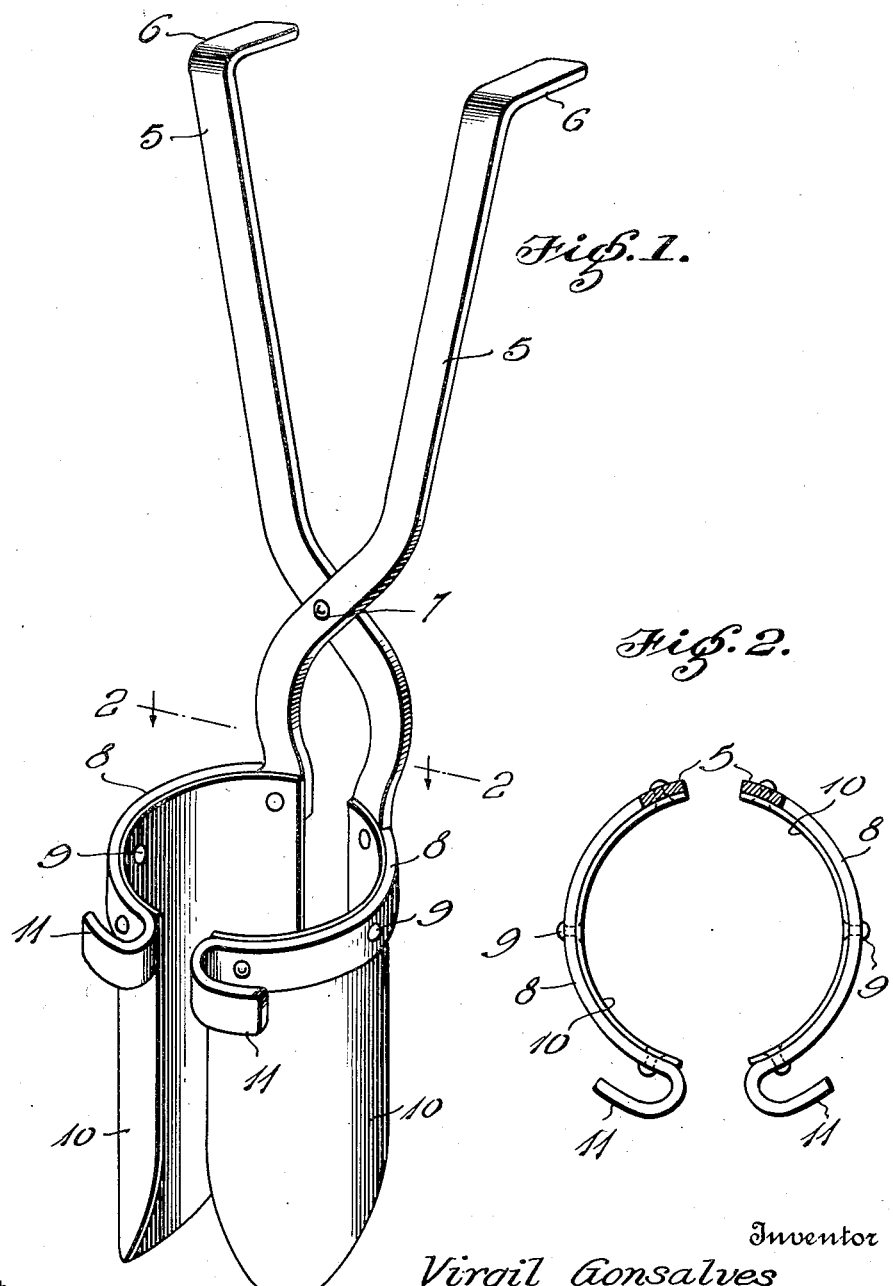

1,970,087

UNITED STATES PATENT OFFICE 1,970,087

TRANSPLANTING TOOL

Virgil Gonsalves, Monterey, Calif., assignor of fifty-one per cent to Hugh Van Swearingen, Carmel, Calif.

Application November 8, 1933, Serial No. 697,191

1 Claim. (Cl. 55—68)

The invention aims to provide a new and improved tool for use in removing growing plants, shrubs and the like directly from the earth, from cans, pots, flats, etc. without disturbing the earth in which they are rooted, other than bodily lifting a "ball" of said earth, and the tool is usable to equal advantage for digging new holes into which the plants, shrubs or the like may be replanted with the undisturbed "balls" of earth around their roots.

The tool embodies two curved blades to be forced into the earth, and two upright hand levers fulcrumed to each other between their ends, the lower end portions of said levers being bent laterally in the same direction, bowed away from each other, and secured to the upper ends of said blades, and a more specific object of the invention is to provide the free ends of these laterally bent bowed portions with outward return bends at their terminals, said return bends constituting effective foot pieces for use when forcing the blades into the earth.

With the foregoing in view, the invention resides in the novel subject matter hereinafter described and claimed, description being accomplished by reference to the accompanying drawing.

Fig. 1 is a perspective view.

Fig. 2 is a horizontal sectional view on line 2—2 of Fig. 1.

In the drawing above briefly described, the numerals 5 denote two hand levers having laterally bent upper ends 6 constituting hand grips. In the present showing, these levers cross each other between their ends and a fulcrum 7 passes through said levers at their crossing point. The lower end portions 8 of both levers are bent laterally in the same direction, are outwardly bowed away from each other, and are connected by rivets or in any other desired way 9, with the upper ends of two vertical curved blades 10 adapted to penetrate the earth. The free ends or terminals of the portions 8 are provided with outward return bends 11 which project outwardly beyond the blades 10 and constitute effective foot pieces for use when using the foot to force the blades into the earth, said return bends being horizontally positioned.

By forming the tool in the manner shown and described, it may be manufactured very easily and at little expense, may be sold at small cost, and will be highly efficient and desirable.

In using the tool, the hand grips 6 are held in the user's two hands, so that the blades 10 are both spaced about equi-distantly throughout their height. Then, these blades are placed astride the plant or the like to be removed from the ground or reset, and with one foot, the user presses downwardly upon the return bends 11, thereby quickly and easily forcing the blades 10 into the earth. The handles or the like 6 are then moved toward each other, causing the blades 10 to so grip the "ball" of earth that it and the growing plant or the like may be easily lifted without disturbing the roots. The tool may also be used for digging new holes into which to transplant shrubs, plants, trees, etc., the manner of use being the same as above described. When transplanting, one or more new holes may first be dug and the tool may then be employed for not only removing the plants, shrubs, etc. to be reset, from their previous settings, but for bodily carrying them and the earth around their roots, and depositing the latter in the newly formed holes.

The details disclosed are preferably followed but within the scope of the invention as claimed, minor variations may, of course, be made.

I claim:

A transplanting tool comprising two curved blades to be forced into the earth, two hand levers fulcrumed to each other between their ends, the lower end portions of said levers being bent laterally in the same direction, being longitudinally bowed away from each other, being secured to the upper ends of said blades, and having outward return bends at their extremities, said return bends projecting beyond said blades and being horizontally positioned to constitute foot pieces for use when forcing said blades into the earth.

VIRGIL GONSALVES.